United States Patent
Feng et al.

(10) Patent No.: US 12,508,759 B2
(45) Date of Patent: Dec. 30, 2025

(54) DUAL INJECTION SYSTEM AND SYNCHRONIZATION CONTROL METHOD THEREOF

(71) Applicant: Ningbo LK Technology Co., Ltd., Ningbo (CN)

(72) Inventors: Guangming Feng, Ningbo (CN); Anqing Lv, Ningbo (CN); Min Xi, Ningbo (CN); Ruiting Zhang, Ningbo (CN); Mingyuan Ren, Ningbo (CN); Binyao Gao, Ningbo (CN); Jiangpin Hu, Ningbo (CN)

(73) Assignee: Ningbo LK Technology Co., Ltd. (CN)

(*) Notice: Subject to any disclaimer, the term of this patent is extended or adjusted under 35 U.S.C. 154(b) by 0 days.

(21) Appl. No.: 18/970,981

(22) Filed: Dec. 6, 2024

(65) Prior Publication Data
US 2025/0353233 A1    Nov. 20, 2025

(30) Foreign Application Priority Data

May 15, 2024   (CN) .......................... 202410598960.6

(51) Int. Cl.
*B29C 45/13* (2006.01)
*B29C 45/53* (2006.01)
*B29C 45/77* (2006.01)
*B29C 45/82* (2006.01)

(52) U.S. Cl.
CPC .............. *B29C 45/77* (2013.01); *B29C 45/13* (2013.01); *B29C 45/531* (2013.01); *B29C 45/82* (2013.01); *B29C 2945/76498* (2013.01); *B29C 2945/76682* (2013.01); *B29C 2945/76859* (2013.01); *B29C 2945/76936* (2013.01)

(58) Field of Classification Search
None
See application file for complete search history.

(56) References Cited

U.S. PATENT DOCUMENTS

2024/0131767 A1* 4/2024 Duffner .................. B29C 45/76

* cited by examiner

*Primary Examiner* — Armand Melendez (57) ABSTRACT

Provided are a dual injection system and a synchronization control method thereof. The system includes a primary injection system and a secondary injection system, where the primary injection system and the secondary injection system each include a speed injection oil circuit and a booster oil circuit; the speed injection oil circuit of the primary injection system and the speed injection oil circuit of the secondary injection system are arranged independently of each other; and the booster oil circuit of the primary injection system and the booster oil circuit of the secondary injection system each include an A-bridge valve group and are arranged in coordination with each other. The method is configured to perform a synchronization control on the primary injection system and the secondary injection system of the system.

4 Claims, 3 Drawing Sheets

DUAL INJECTION SYSTEM AND SYNCHRONIZATION CONTROL METHOD THEREOF

CROSS REFERENCE TO THE RELATED APPLICATIONS

This application is based upon and claims priority to Chinese Patent Application No. 202410598960.6, filed on May 15, 2024, the entire contents of which are incorporated herein by reference.

TECHNICAL FIELD

The present disclosure relates to the technical field of metal part die casting, and in particular to a dual injection system and a synchronization control method thereof.

BACKGROUND

There are often distal quality issues in the processing of large die-cast parts, that is, the die-casting quality of a die-cast part becomes poorer at positions further away from an injection gate. To solve this problem, a dual injection system is used for die casting of large die-cast parts. As the name suggests, the dual injection system includes two identical injection systems arranged on a die-casting machine. The two injection systems are controlled to maintain given target speed-position curves and to maintain synchronization (synchronization in a broad sense, which means that the deviation between the two injection systems is at a given value).

During the process injection of the dual injection system, the position difference between the two injection systems is related to the intersection of molten metal streams on two sides in the die. Due to the confluence of the two molten metal streams, the product quality at the intersection is defective. Therefore, the issue at the intersection will be taken into consideration in die design. Designing a separate cavity similar to an overflow chamber at the intersection can minimize the impact of the intersection on the main body of the die-cast part. Since the intersections are located at different positions in different dies, the synchronization of positions is quite important. The two injection systems need to operate according to given target speed-position curves, respectively. One injection system is provided with a master cylinder, and the other injection system is provided with a slave cylinder. The slave cylinder operates according to the given target speed-position curve and follows the master cylinder, so as to maintain the set difference between the target positions of the two injection systems. The synchronization of the two injection systems in position is ensured through control.

In the prior art, the main method to achieve the synchronization is to make the diameters of injection plungers on two sides consistent and to control the two injection systems through the same oil circuit. Thus, the synchronization of hydraulic cylinders can be controlled by simply controlling the oil circuit. However, in actual use, the hydraulic cylinder structures and working conditions of the two injection systems cannot be exactly the same. Therefore, if only the oil circuit is controlled, the synchronization of the dual injection system cannot be precisely controlled. In order to meet the production quality requirements of large die-cast parts, it is currently urgent to improve the conventional dual injection systems.

SUMMARY

An objective of the present disclosure is to provide a dual injection system to address at least one of the deficiencies mentioned in the background section.

Another objective of the present disclosure is to provide a synchronization control method of the dual injection system to address at least one of the deficiencies mentioned in the background section.

To achieve at least one of the above objectives, the present disclosure adopts the following technical solutions. A dual injection system is provided, including a primary injection system and a secondary injection system, where the primary injection system and the secondary injection system each include a speed injection oil circuit and a booster oil circuit; the speed injection oil circuit of the primary injection system and the speed injection oil circuit of the secondary injection system are arranged independently of each other; and the booster oil circuit of the primary injection system and the booster oil circuit of the secondary injection system each include an A-bridge valve group and are arranged in coordination with each other.

Preferably, the speed injection oil circuit of the primary injection system and the speed injection oil circuit of the secondary injection system each include an injection cylinder, a control valve V03, and an accumulator V01; and the accumulator V01 is in communication with a rodless chamber of the injection cylinder through the control valve V03.

Preferably, the booster oil circuit of the primary injection system and the booster oil circuit of the secondary injection system each include a booster cylinder, a control valve V04, and a control valve V08; the control valve V04 is in communication with the control valve V08 to form a series oil circuit; the series oil circuit includes a first end in communication with the rodless chamber of the injection cylinder and a second end connected to an oil tank; a rod chamber of the booster cylinder is communicated between the control valve V04 and the control valve V08 through a pipe to form the A-bridge valve group; the rod chamber of the booster cylinder of the primary injection system is in communication with the rod chamber of the booster cylinder of the secondary injection system through a pipe, and a rodless chamber of the booster cylinder of the primary injection system is in communication with a rodless chamber of the booster cylinder of the secondary injection system through a pipe; and booster accumulators are respectively in communication with the booster cylinder of the primary injection system and the booster cylinder of the secondary injection system and are communicated through a gas pipe.

A synchronization control method of the above-mentioned dual injection system is provided, where the injection cylinder of the primary injection system is preset as a master injection cylinder and the injection cylinder of the secondary injection system is preset as a slave injection cylinder, and the synchronization control method includes the following steps:

S100: in a speed injection stage: generating a control signal based on a target speed curve and a target position curve, and controlling, by the speed injection oil circuit, a motion of the master injection cylinder according to the control signal;

S200: controlling a motion of the slave injection cylinder based on the controlling of the motion of the master injection cylinder, and performing a feedback adjustment on the slave injection cylinder based on a position deviation between the slave injection cylinder and the master injection cylinder during the motion to synchronize the slave injection cylinder with the master injection cylinder; and S300: in a boost injection stage: generating, by the booster cylinder, a corresponding opening control signal based on a target pressure and a feedback pressure from the rod chamber; and performing an opening adjustment on the A-bridge valve group according to the opening control signal to control a motion of the booster cylinder.

Preferably, a speed control process of the master injection cylinder includes: acquiring a feedforward signal $u_1$ by an identification based on the target speed curve and an actual pressure of the master injection cylinder, where the feedforward signal $u_1$ is expressed as: $u_1=f_1(p_1,p_2,v_{d1})$; adaptively processing the feedforward signal u based on a feedforward proportional curve to acquire a feedforward signal $u_2$ of the master injection cylinder, where the feedforward signal $u_2$ is expressed as: $u_2=f_2(u_1,v_{d1},v_{a1})$; and correspondingly controlling, by the speed injection oil circuit, a respective valve group based on the feedforward signal $u_2$; where $p_1$ denotes a rodless chamber pressure of the master injection cylinder, $p_2$ denotes a rod chamber pressure of the master injection cylinder, $v_{d1}$ denotes a target speed of the master injection cylinder, and $v_{a1}$ denotes a current actual speed of the master injection cylinder.

Preferably, a position of the master injection cylinder is controlled by proportional-integral-derivative (PID) control via the following steps: performing a difference comparison between a target position and a current position to acquire a feedback signal $u_3$, and correspondingly controlling, by the speed injection oil circuit, a respective valve group based on the feedback signal $u_3$, where the feedback signal $u_3$ is expressed as:

$$u_3 = K_1(X_{d1} - X_{a1}) + \frac{K_2}{s}(X_{d1} - X_{a1}) + K_3 S(X_{d1} - X_{a1});$$

where $X_{d1}$ denotes the target position of the master injection cylinder, $X_{a1}$ denotes the current position of the master injection cylinder, $K_1$ denotes a proportional coefficient, $K_2$ denotes an integral constant, $K_3$ denotes a derivative constant, and S denotes a sampling period.

Preferably, the motion of the slave injection cylinder includes a feedforward motion and a following motion; during the feedforward motion, a speed and a position of the slave injection cylinder are controlled in a manner identical to the master injection cylinder; the following motion includes: performing a PID control based on a target position difference and an actual position difference between the master injection cylinder and the slave injection cylinder to acquire a feedback signal $u_8$, where the feedback signal $u_8$ is expressed as follows:

$$u_8 = K_7 \cdot A + \frac{K_8}{s} \cdot A + K_9 \cdot S \cdot A;$$
$$A = [(X_{a1} - X_{a2}) - (X_{d1} - X_{d2})];$$

where $X_{a1}$ denotes a current actual position of the master injection cylinder, $X_{a2}$ denotes a current actual position of the slave injection cylinder, $X_{d1}$ denotes a target position of the master injection cylinder, $X_{d2}$ denotes a target position of the slave injection cylinder, $K_7$ denotes a proportional coefficient, Ka denotes an integral constant, $K_9$ denotes a derivative constant, and S denotes a sampling period.

Preferably, the boost injection stage includes a pressure buildup phase and a pressure stabilization phase; in the pressure buildup phase and the pressure stabilization phase, an opening of the control valve V04 and an opening of the control valve V08 are differently controlled to adjust the motion of the booster cylinder.

Preferably, in the pressure buildup phase, a current boost speed of the booster cylinder is acquired based on the target pressure, a current rod chamber pressure of the booster cylinder, and a current position of the injection cylinder; and an opening control signal $u_{10}$ of the control valve V08 is acquired based on a boost speed identification result, where $u_{10}$ is expressed as: $u_{10}=f_5(p_d,p_{a1},X_{a1})$, and the control valve V04 is in a fully closed state; and in the pressure stabilization phase, a voltage ratio between the control valve V04 and the control valve V08 is acquired by identifying an opening ratio of the A-bridge valve group; and a voltage of the control valve V04 and a voltage of the control valve V08 are gradually reduced to a set value according to a set relationship, where a control signal of the control valve V04 is $u_{12}$, and a control signal of the control valve V08 is un, and $u_{12}=u_{11}f_6(p_d)$, where $p_d$ denotes the target pressure, $p_{a1}$ denotes a current actual rodless chamber pressure of the injection cylinder, $X_{a1}$ denotes a current actual position of the injection cylinder, and $f_6(p_d)$ denotes an opening ratio identification result for the A-bridge valve group.

Preferably, a pressure feedback control is performed on a boosting process by applying a feedback control signal $u_{13}$ to the control valve V04, such that a total control signal of the control valve V04 in the pressure stabilization phase is $u_{12}+u_{13}$, where the feedback control signal $u_{13}$ is expressed as:

$$u_{13} = K_{10}(p_d - p_{a1}) + \frac{K_{11}}{s}(p_d - p_{a1}) + K_{12} S(p_d - p_{a1});$$

where $K_{10}$ denotes a proportional coefficient, $K_{11}$ denotes an integral constant, $K_{12}$ denotes a derivative constant, and S denotes a sampling period.

Compared with the prior art, the present disclosure has the following advantages.

In the speed injection stage, the secondary injection system performs feedback following based on parameters of the primary injection system to achieve the synchronization. In the boost injection stage, the synchronization is achieved by changing the oil circuit structure of the injection system. Compared to conventional methods, the present disclosure effectively improves the synchronization accuracy and stability of the dual injection system.

BRIEF DESCRIPTION OF DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE EMBODIMENTS

The present disclosure will be further described below with reference to the drawings and specific embodiments. It should be noted that, provided that there is no conflict, new embodiments can be formed by arbitrarily combining various embodiments or various technical features described below.

In the description of the present disclosure, it should be noted that the orientation or position relationships indicated by nouns of locality such as the terms "center", "horizontal", "longitudinal", "length", "width", "thickness", "upper", "lower", "front", "rear", "left", "right", "vertical", "horizontal", "top", "bottom", "inner", "outer", "clockwise" and "counterclockwise" are based on those shown in the drawings. It is only for the convenience of describing the present disclosure and simplifying the description, and does not indicate or imply that the referred apparatus or element must have a specific orientation and be constructed and operated in a specific orientation. Therefore, it cannot be understood as limiting the specific protection scope of the present disclosure.

It should be noted that the terms such as "first" and "second" in the description and claims of the present disclosure are intended to distinguish similar objects but do not necessarily indicate a specific order or sequence.

The terms "include", "provided with" and any of their variants in the specification and claims of the present disclosure are intended to cover a non-exclusive inclusion. For example, a process, method, system, product or device that includes a list of steps or units is not necessarily limited to those steps or units which are clearly listed. Instead, they may include other steps or units which are not expressly listed or inherent to such a process, method, product, or device.

Figure 1:
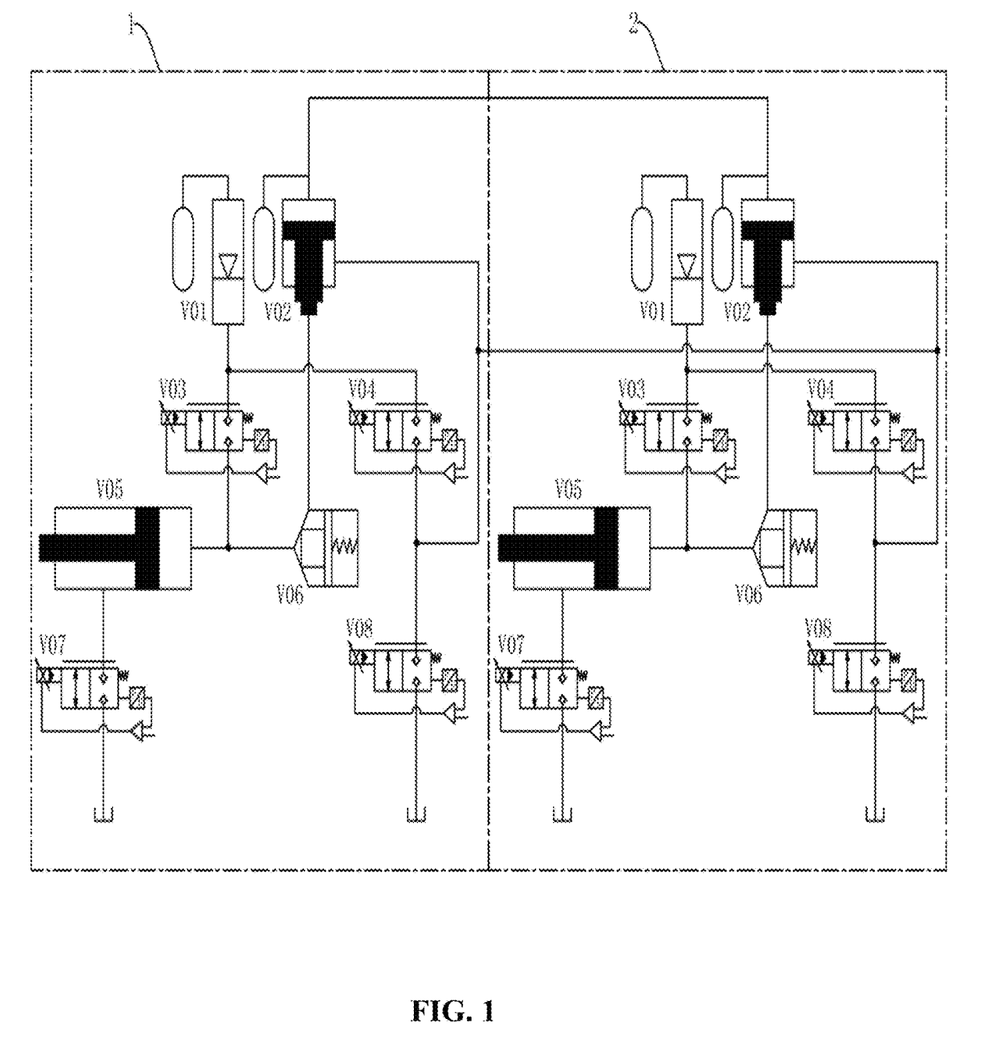
FIG. 1 is an overall structural diagram of an oil circuit of a dual injection system according to the present disclosure.

An aspect of the present disclosure provides a dual injection system. As shown in FIG. 1, in a preferred embodiment, the dual injection system includes a primary injection system 1 and a secondary injection system 2. The primary injection system 1 and the secondary injection system 2 each include a speed injection oil circuit and a booster oil circuit. In the specific design of the speed injection oil circuits and the booster oil circuits, the speed injection oil circuits of the primary injection system 1 and the secondary injection system 2 are arranged independently of each other, and the booster oil circuits of the primary injection system 1 and the secondary injection system 2 each include an A-bridge valve group and are arranged in coordination with each other.

It should be noted that a speed injection stage includes a slow injection stage and a fast injection stage. The injection speed during the slow injection stage is generally 0.1-0.4 m/s, while the injection speed during the fast injection stage is generally 2-5 m/s. That is to say, the motion curve of the speed injection stage includes both acceleration and uniform speed processes, making the motion process of the speed injection stage complex. If the primary injection system 1 and the secondary injection system 2 are connected through the same speed injection oil circuit, it is hard to achieve precise synchronization through oil circuit structure design in the complex working conditions of the two injection systems, thereby failing to meet the accuracy requirements of large die-cast parts. Therefore, in this embodiment, the speed injection oil circuits of the two injection systems are arranged independently of each other. According to the working parameters of the two injection systems, synchronization is achieved by implementing corresponding software control, effectively improving the synchronization control accuracy and stability of the complex motion of the primary injection system 1 and the secondary injection system 2 under different working conditions.

Meanwhile, in a boost injection stage, the motion process of the injection system is relatively simple, so synchronization between the injection systems can be achieved through oil circuit design. The primary injection system 1 and the secondary injection system 2 use identical booster oil circuits that are provided with an A-valve group structure and are cooperatively communicated through a pipe. During boosting, the primary injection system 1 and the secondary injection system 2 are subject to the same driving pressure, thereby ensuring that the output pressures of the primary injection system 1 and the secondary injection system 2 are the same.

In this embodiment, as shown in FIG. 1, the speed injection oil circuits of the primary injection system 1 and the secondary injection system 2 each include an injection cylinder V05, a control valve V03, a control valve V07, and an accumulator V01. The accumulator V01 is in communication with a rodless chamber of the injection cylinder V05 through the control valve V03, and a rod chamber of the injection cylinder V05 is in communication with an oil tank through the control valve V07. During slow or fast injection, the control valve V03 is opened. The accumulator V01 supplies oil to the rodless chamber of the injection cylinder V05 through the opened control valve V03, and the pressure oil in the rod chamber of the injection cylinder V05 flows back to the oil tank through the opened control valve V07. The injection speed and synchronization requirements for slow or fast injection can be met through opening controls of the servo valves V03 and V07.

In this embodiment, as shown in FIG. 1, the booster oil circuits of the primary injection system 1 and the secondary injection system 2 each include a booster cylinder V02, a control valve V04, and a control valve V08. The control valve V04 is in communication with the control valve V08 to form a series oil circuit. The series oil circuit includes a first end in communication with the rodless chamber of the injection cylinder V05 and a second end connected to the oil tank. The rod chamber of the booster cylinder V02 is communicated at a middle position of the series oil circuit formed by the control valve V04 and the control valve V08 through a pipe. The control valve V04 and the control valve V08 form an A-bridge valve group at a position of the rod chamber of the booster cylinder V02. The rod chambers of the booster cylinders V02 of the primary injection system 1 and the secondary injection system 2 are communicated through a pipe, and the rodless chambers of the booster cylinders V02 of the primary injection system 1 and the secondary injection system 2 are also communicated through a pipe. The booster accumulators in communication with the two booster cylinders V02 respectively are communicated through a gas pipe.

It should be noted that during boost injection, the boosting stability of the injection cylinder V05 is achieved through opening adjustments of the control valve V04 and the control valve V08, and the synchronization control of the output flows between the two booster cylinders V02 is achieved by controlling the opening adjustment parameters.

Specifically, nitrogen cylinders of the booster accumulators of the two booster cylinders V02 are connected through a gas pipe, and the rod chambers of the two booster cylinders V02 are connected through an oil pipe. When the boosting is stable, the gas pressures in the booster parts of the two injection systems are the same, and the pressures in the rod chambers of the booster cylinders V02 are also the same. The friction force of the booster piston has little effect on the pressure. If no friction is considered, then during boosting there is the equation: rodless chamber pressure=(gas pressure of booster accumulator*rodless chamber area of booster cylinder−rod chamber pressure of booster cylinder*rod chamber area of booster cylinder)/piston rod area of booster cylinder. Due to the identical parameters of the booster cylinders V02 in the two injection systems, in case of the same gas pressures and the same rod chamber areas of the booster cylinders, the final rodless chamber pressures of the two booster cylinders V02 are also the same, that is, the final boost injection forces are also the same.

If the booster nitrogen cylinders as well as the rod chambers of the booster cylinders V02 in the two injection systems are not connected and the control relies only on data acquired by pressure sensors, the actual boost pressures of the two injection systems may not be consistent due to the accuracy of the data acquired by the pressure sensors. Therefore, the two booster oil circuits are connected through the gas pipe and the oil pipe, ensuring the consistency of the final boost injection forces even in the case of sensor data acquisition errors.

It should be noted that the primary injection system 1 and the secondary injection system 2 can also be communicated through the same booster oil circuit with an A-valve group structure. After the booster nitrogen cylinders and the booster cylinders V02 in the two injection systems are communicated correspondingly, an A-bridge valve group is retained to achieve the synchronous boosting function of the two injection systems. However, firstly, this design will result in an increase in the size of the A-bridge valve group, causing a slower response of the valve group. Secondly, the size of the oil pipe connected to the rod chamber of the booster cylinder V02 will increase, which is not conducive to design and mounting. In this embodiment, the booster oil circuits of the two injection systems are controlled by independent A-bridge valve groups, reducing the size of the valve groups and thereby improving the speed of the valve groups. It is only necessary to maintain consistent pressure during the final stage of boost injection stabilization. Therefore, the two injection systems reduce the diameter of the oil pipe connected to the booster cylinder V02, such that a small amount of oil flowing through can achieve a pressure balance when the pressure is not consistent on both sides.

It can be understood that the specific structures and working principles of the control valves V03, V04, V07, and V08 are well-known technologies to those skilled in the art, and the control valves are preferably servo control valves.

Figure 2:
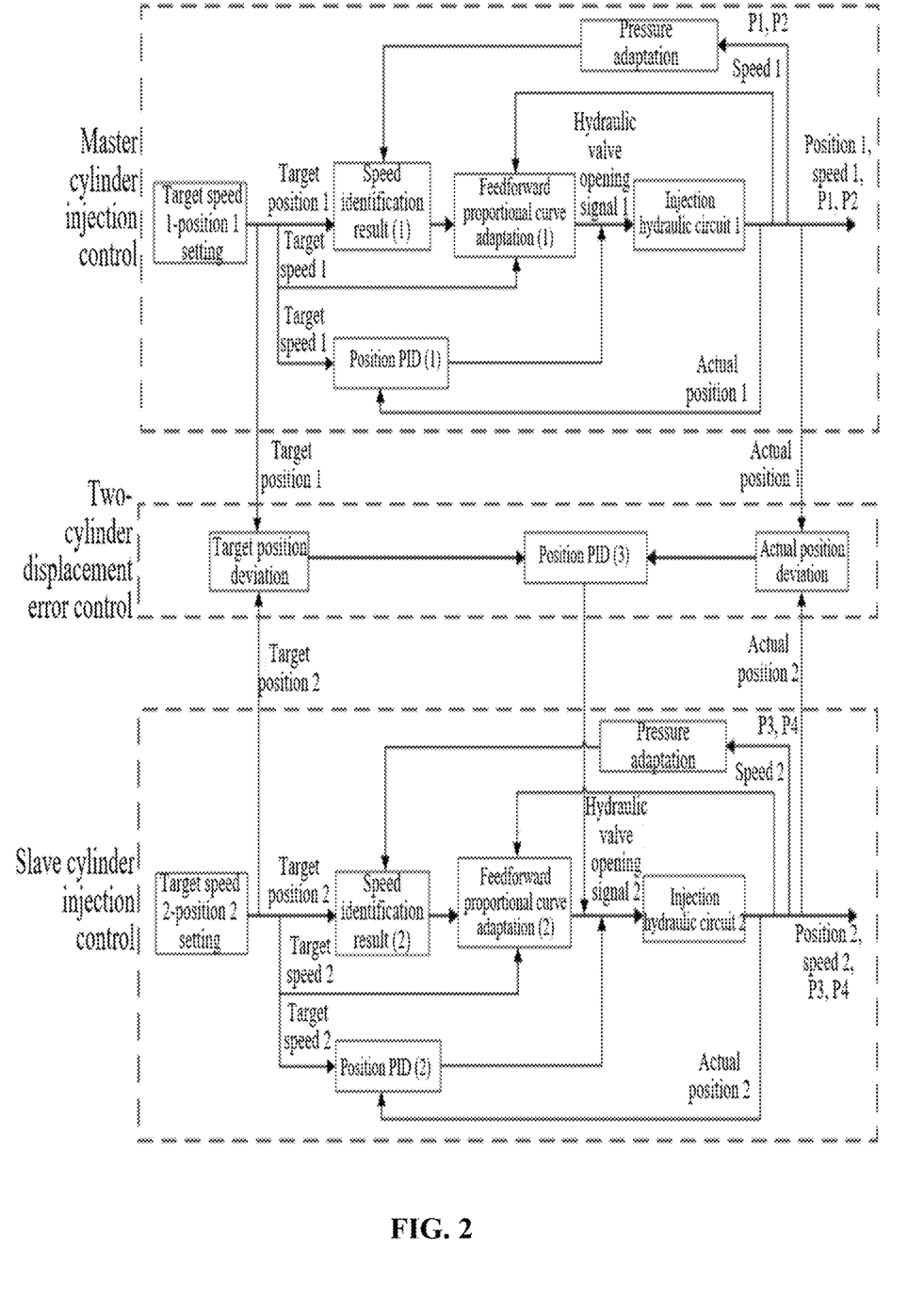
FIG. 2 is a flowchart of a synchronization control in a speed injection stage of the dual injection system according to the present disclosure.
Figure 3:
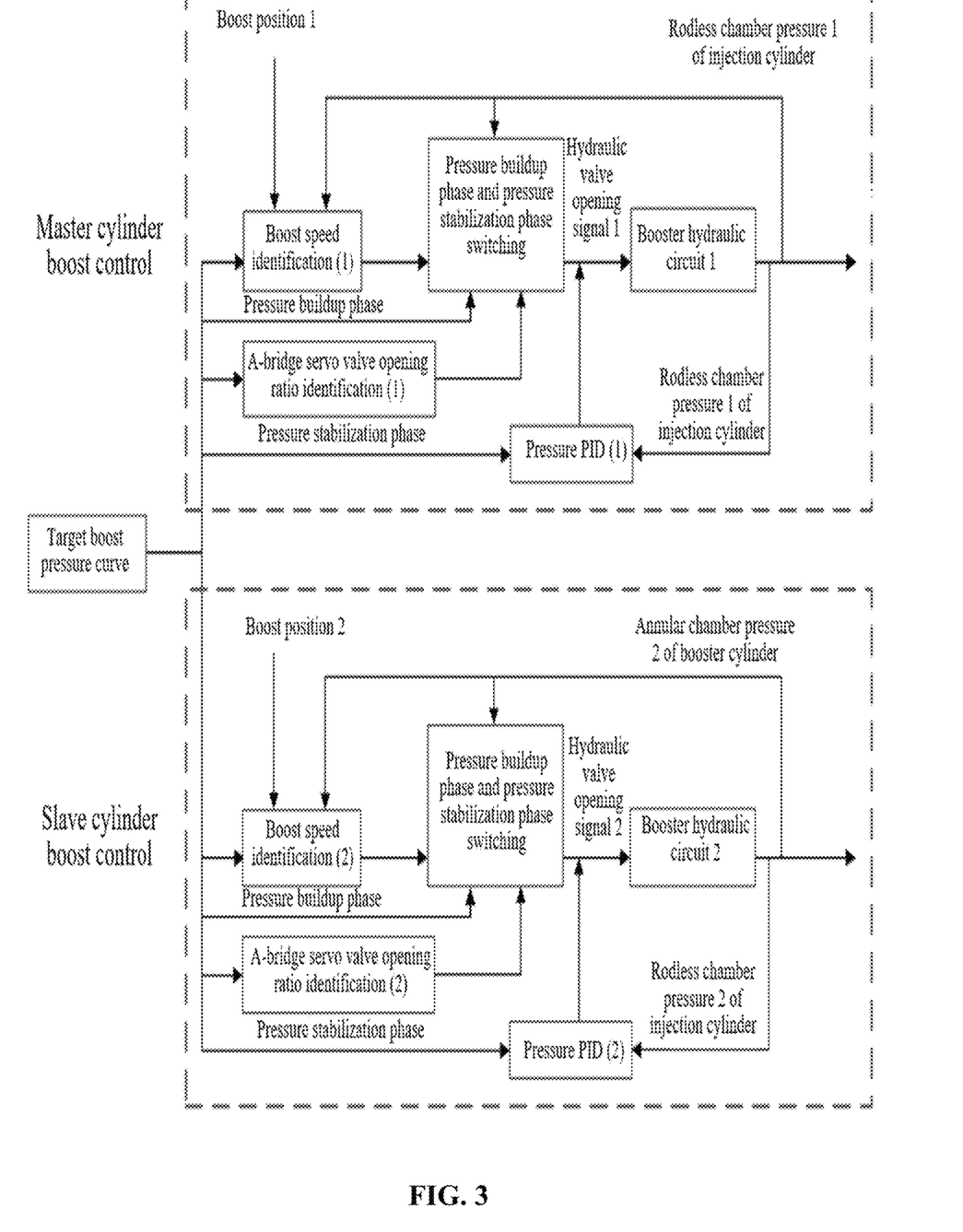
FIG. 3 is a flowchart of a synchronization control in a boost injection stage of the dual injection system according to the present disclosure.

Another aspect of the present disclosure provides a synchronization control method of the above-mentioned dual injection system. As shown in FIGS. 1 to 3, the injection cylinders V05 of the primary injection system 1 and the secondary injection system 2 respectively serve as a master injection cylinder and a slave injection cylinder. In a preferred embodiment, a specific control includes the following steps.

S100. In the speed injection stage, a control signal is generated based on a target speed curve and a target position curve, and the speed injection oil circuit controls a motion of the master injection cylinder according to the control signal.

S200. A motion of the slave injection cylinder is controlled based on the control of the motion of the master injection cylinder, and a feedback adjustment is performed on the slave injection cylinder based on a position deviation between the slave injection cylinder and the master injection cylinder during the motion to synchronize the slave injection cylinder with the master injection cylinder.

S300. In the boost injection stage, the booster cylinder generates a corresponding opening control signal based on a target pressure and a feedback pressure from the rod chamber. An opening adjustment is performed on the A-bridge valve group according to the opening control signal to control a motion of the booster cylinder.

It can be understood from the above content that the synchronization control between the primary injection system 1 and the secondary injection system 2 is mainly reflected in the injection stage. The injection cylinder V05 of the primary injection system 1 performs injection according to the set target position curve and target speed curve. The injection cylinder V05 of the secondary injection system 2 also performs injection according to the set target position curve and target speed curve. Meanwhile, the secondary injection system performs a feedback adjustment based on the motion state information of the injection cylinder V05 of the primary injection system 1, so as to ensure synchronous motion between the injection cylinders V05 of the secondary injection system 2 and the primary injection system 1. In the boost injection stage, the booster cylinders V02 of the primary injection system 1 and the secondary injection system 2 perform corresponding actions according to the set target position curve and target speed curve, and synchronize with each other on the oil circuit through the oil pipe and the gas pipe. For the convenience of understanding, the following provides a detailed description of the synchronization control process between the primary injection system 1 and the secondary injection system 2 in the injection stage and the boost injection stage.

1. Injection Stage
   (1) As shown in FIG. 2, the specific working control process of the master injection cylinder in the primary injection system 1 is as follows:
   Based on the target speed corresponding to the set target speed curve and the actual pressure of the master injection cylinder, a feedforward signal $u_1$ is acquired through identification. The feedforward signal $u_1$ is expressed as: $u_1=f_1(p_1,p_2,v_{d1})$, where $p_1$ denotes a rodless chamber pressure of the master injection cylinder, $p_2$ denotes a rod chamber pressure of the master injection cylinder, and $v_{d1}$ denotes a target speed of the master injection cylinder.

The feedforward signal $u_1$ is adaptively processed based on a feedforward proportional curve to acquire a feedforward signal $u_2$ of the master injection cylinder. The feedforward signal $u_2$ is expressed as: $u_2=f_2(u_1,v_{d1},v_{a1})$, where $v_{a1}$ denotes a current actual speed of the master injection cylinder.

It can be understood that the feedforward signal $u_1$ of the master injection cylinder is adaptively processed through a feedforward ratio $f_2(v_{d1}, v_{a1})$ to meet the actual injection requirement, making the feedforward result more accurate.

The above control process is a speed control process of the master injection cylinder. The injection process requires the speed control. What's more important, the injection process requires the position control to prevent changes in the high-speed starting point. For the injection position control, in order to prevent the influence of the external environment on the position control, a PID position control method is introduced in this embodiment. The specific control process is as follows.

A difference comparison is performed between a target position corresponding to the target position curve and a current position of the master injection cylinder to acquire a feedback signal $u_3$, where the feedback signal $u_3$ is expressed as:

$$u_3 = K_1(X_{d1} - X_{a1}) + \frac{K_2}{s}(X_{d1} - X_{a1}) + K_3 S(X_{d1} - X_{a1}).$$

In the expression, $X_{d1}$ denotes a target position of the master injection cylinder, $X_{a1}$ denotes a current actual position of the master injection cylinder, $K_1$ denotes a proportional coefficient, $K_2$ denotes an integral constant, $K_3$ denotes a derivative constant, and S denotes a sampling period.

It can be understood that in the feedback signal $u_3$, a proportional element $K_1(X_{d1}-X_{a1})$ can quickly output a control signal based on the difference between the target position and the actual position. When the master injection cylinder encounters an error caused by the load, the error will increase. At this point, a derivative element $K_3 S(X_{d1}-X_{a1})$ can quickly respond and generate an output. An integral element $$\frac{K_2}{s}(x_{d1} - x_{a1})$$

will integrate the accumulated error to minimize it as much as possible.

It should be noted that, as mentioned above, in the injection stage, the control signal ultimately output to the valve group of the master injection cylinder is $u_4=u_2+u_3$. The speed feedforward signal $u_2$ and the position feedback signal $u_3$ are added and jointly applied to the control valves V03 and V07 of the primary injection system 1 to ensure that the master injection cylinder performs the injection according to the set target speed curve.

It should be noted that, as mentioned above, the position control of the master injection cylinder is the most important during injection. Therefore, in this embodiment, preferably, a feedback adjustment control is performed on the position control of the master injection cylinder.

(2) As shown in FIG. 2, the specific working control process of the slave injection cylinder in the secondary injection system 2 is as follows.

The motion of the slave injection cylinder includes a feedforward motion and a following motion. During the feedforward motion, a speed and a position of the slave injection cylinder are controlled in a manner identical to the master injection cylinder. According to the control method of the master injection cylinder mentioned above, the target position and target speed curve of the slave injection cylinder are followed.

Specifically, based on the set target speed, a feedforward signal $u_5$ of the slave injection cylinder is acquired. The feedforward signal $u_5$ is expressed as: $u_5=f_3(p_3,p_4,v_{d2})$, where $p_2$ denotes a rodless chamber pressure of the slave injection cylinder, $p_3$ denotes a rod chamber pressure of the slave injection cylinder, and $v_{d2}$ denotes a target speed of the slave injection cylinder. After the feedforward signal $u_5$ of the slave injection cylinder is adaptively processed through the feedforward proportional curve, a feedforward signal $u_6$ of the slave injection cylinder is acquired based on the relationship between the current speed and the target speed. The feedforward signal $u_6$ is expressed as: $u_6=f_4$ ($u_5$, $v_{d2}$, $v_{a2}$), where $v_{a2}$ denotes a current actual speed of the slave injection cylinder.

It can be understood that the synchronization control between the slave injection cylinder and the master injection cylinder can be a speed synchronization control, a position synchronization control, or a speed and position synchronization control. From the above content, it can be seen that in the injection stage, the position control of the injection cylinder is the most important. Therefore, in order to simplify the control process and reduce the difficulty of control, in this embodiment, preferably, synchronization is achieved based on the position following of the slave injection cylinder and the master injection cylinder.

Specifically, the slave injection cylinder has two sets of feedback controls. One set of feedback control is performed on the target and actual positions of the slave injection cylinder. This feedback control is the same as the position control of the master injection cylinder, and uses PID position control. The other set of feedback control is performed on the following motion process of the slave injection cylinder, and is the PID position control on a target position difference and an actual position difference between the master injection cylinder and the slave injection cylinder.

Based on the position PID feedback on the target and actual positions of the slave injection cylinder, a control signal $u_2$ is acquired. The feedback signal $u_7$ is expressed as:

$$u_7 = K_4(X_{d2} - X_{a2}) + \frac{K_5}{s}(X_{d2} - X_{a2}) + K_6 S(X_{d2} - X_{a2}).$$

In the expression, $X_{d2}$ denotes a target position of the slave injection cylinder, $X_{a2}$ denotes a current actual position of the slave injection cylinder, $K_4$ denotes a proportional coefficient, $K_5$ denotes an integral constant, $K_6$ denotes a derivative constant, and S denotes a sampling period.

On the basis of the above control, a PID position control is performed according to the target position difference and the actual position difference between the master injection cylinder and the slave injection cylinder, and a feedback signal $u_8$ is acquired. The feedback signal $u_8$ is expressed as follows:

$$u_8 = K_7 \cdot A + \frac{K_8}{s} \cdot A + K_9 \cdot S \cdot A.$$
$$A = [(X_{a1} - X_{a2}) - (X_{d1} - X_{d2})].$$

In the expression, $X_{a1}$ denotes the current actual position of the master injection cylinder, $X_{a2}$ denotes the current actual position of the slave injection cylinder, $X_{d1}$ denotes the target position of the master injection cylinder, $X_{d2}$ denotes the target position of the slave injection cylinder, $X_{a1}-X_{a2}$ denotes the actual position difference between the master injection cylinder and the slave injection cylinder, $X_{d1}-X_{d2}$ denotes the target position difference between the master injection cylinder and the slave injection cylinder, $K_7$ denotes a proportional coefficient, $K_5$ denotes an integral constant, $K_9$ denotes a derivative constant, and S denotes a sampling period.

It should be noted that, as mentioned above, in the injection stage, the control signal ultimately output to the valve group of the slave injection cylinder is $u_9=u_6+u_7+u_8$. That is, based on the feedback signals of the target and actual positions of the slave injection cylinder, as well as the following feedback signal between the master injection cylinder and the slave injection cylinder, the speed feedforward signals are added and jointly applied to the control valves V03 and V07 of the secondary injection system 2. This ensures that the slave injection cylinder performs injection according to the set target speed curve and well follows the position of the master injection cylinder during the injection process. In this way, the synchronization between the injection stages of the primary injection system 1 and the secondary injection system 2 are ensured, thereby ensuring the consistency of the molten metal streams at the intersection inside the die during each injection.

2. Boost Injection Stage

From the above content, it can be seen that in the boost injection stage, the primary injection system 1 and the secondary injection system 2 achieve synchronization on the oil circuit through the oil pipe and the gas pipe connected to the booster oil circuit. Therefore, the primary injection system 1 and the secondary injection system 2 do not need synchronization control on the oil circuit in the boost injection stage, and only need to accelerate the single-sided boosting and pressure buildup time as much as possible.

Meanwhile, the reasons why the primary injection system 1 and the secondary injection system 2 adopt two independent sets of controls for boost injection are as follows. At the beginning of boosting, due to different load forces, the rodless chamber pressures of the injection cylinders V05 in the two injection systems may be different, and the volumes of oil compressed may also be different. As a consequence, when the booster cylinders V02 are boosting, the displacements of the booster pistons may be different, and the oil discharge flows in the rod chambers of the booster cylinders V02 may also be different. In order to ensure that the primary injection system 1 and the secondary injection system 2 have the same pressure buildup time as much as possible, the openings of the control valves V08 in the two injection systems are different. Therefore, the two injection systems adopt independent boost controls.

In view of this, the specific control process in the boost injection stage of one of the injection systems is described in detail below. The boost injection stage includes a pressure buildup phase and a pressure stabilization phase. In the pressure buildup phase and the pressure stabilization phase, the opening controls on the control valve V04 and the control valve V08 are different to perform the motion adjustment on the booster cylinder.

In this embodiment, as shown in FIG. 3, in the pressure buildup phase, the current boost speed of the booster cylinder V02 is acquired based on the target pressure, the current rod chamber (annular chamber) pressure of the booster cylinder V02, and the current position of the injection cylinder V05. Based on the identification result of the boost speed, an opening control signal of the control valve V08 is acquired. At this point, a control voltage of the control valve V08 is $u_{10}$. The control voltage $u_{10}$ is expressed as: $u_{10}=f_5(p_d,p_{a1},X_{a1})$, where $p_d$ denotes a target pressure, $p_{a1}$ denotes a current actual rodless chamber pressure of the injection cylinder V05, and $X_{a1}$ denotes a current actual position of the injection cylinder V05. When the rodless chamber pressure of the injection cylinder V05 rises to a level close to the stable boost pressure set for the boost injection stage, the pressure buildup phase is completed and will switch to the pressure stabilization phase. At this point, the control valve V04 is in a fully closed state.

In the pressure stabilization phase, the voltage ratio between the control valve V04 and the control valve V08 is acquired by identifying the relationship between the voltage ratio and pressure, that is, the opening ratio of the A-bridge valve group between the control valve V04 and the control valve V08. According to a set relationship, the voltages of the two control valves are gradually reduced to a certain set value, thereby achieving pressure stability. At this point, a control signal of the control valve V04 is $u_{12}$, and a control signal of the control valve V08 is $u_{11}$. $u_{12}=u_{11}f_6(p_d)$, where $f_6(p_d)$ denotes an opening ratio identification result for the A-bridge valve group.

It can be understood that based on the above control process, for the control valve V04, the control signal in the pressure buildup phase is 0 and the control signal in the pressure stabilization phase is $u_{12}$. For the control valve V08, the control signal in the pressure buildup phase is $u_{10}$ and the control signal in the pressure stabilization phase is $u_{11}$.

In this embodiment, the control process of the boost injection mentioned above is a feedforward process. Due to inevitable errors in the feedforward process, a pressure feedback control, such as a feedback PID control, is introduced to ensure that the rodless chamber pressure of the injection cylinder V05 reaches the set value as much as possible. The feedback control mainly acts on the control valve V04 and does not act on the control valve V08. The pressure feedback control is performed on the boosting process. A feedback control signal $u_{13}$ is applied to the control valve V04, such that a total control signal of the control valve V04 in the pressure stabilization phase is $u_{12}+u_{13}$. The feedback control signal $u_{13}$ is expressed as:

$$u_{13} = K_{10}(p_d - p_{a1}) + \frac{K_{11}}{s}(p_d - p_{a1}) + K_{12}S(p_d - p_{a1}).$$

In the expression, $K_{10}$ denotes a proportional coefficient, $K_{11}$ denotes an integral constant, $K_{12}$ denotes a derivative constant, and S denotes a sampling period.

It can be understood that based on the above feedback control process, for the control valve V04, the control signal in the pressure buildup phase is 0 and the control signal in the pressure stabilization phase is $u_{12}+u_{13}$. For the control valve V08, the control signal in the pressure buildup phase is $u_{10}$ and the control signal in the pressure stabilization phase is $u_{11}$. The pressure boost injection stage is divided into a pressure buildup phase and a pressure stabilization phase, and the identification results are introduced as feedforward to effectively improve the pressure buildup speed and accuracy.

The basic principles, main features, and advantages of the present disclosure are described above. It should be understood by those skilled in the art that the present disclosure is not limited by the above embodiments, and the above embodiments and the description only illustrate the principle of the present disclosure. Various changes and modifications may be made to the present disclosure without departing from the spirit and scope of the present disclosure, and such changes and modifications all fall within the protection scope of the present disclosure. The protection scope of the present disclosure is defined by the appended claims and equivalents thereof.

What is claimed is:

1. A dual injection system, comprising a primary injection system and a secondary injection system, wherein the primary injection system and the secondary injection system each comprise a speed injection oil circuit and a booster oil circuit, wherein the speed injection oil circuit of the primary injection system and the speed injection oil circuit of the secondary injection system are arranged independently of each other; and the booster oil circuit of the primary injection system and the booster oil circuit of the secondary injection system each comprise an A-bridge valve group and are arranged in coordination with each other;

the speed injection oil circuit of the primary injection system and the speed injection oil circuit of the secondary injection system each comprise an injection cylinder;

the booster oil circuit of the primary injection system and the booster oil circuit of the secondary injection system each comprise a booster cylinder, a control valve V04, and a control valve V08;

the control valve V04 is in communication with the control valve V08 to form a series oil circuit: the series oil circuit comprises a first end in communication with a rodless chamber of the injection cylinder and a second end connected to an oil tank; and a rod chamber of the booster cylinder is communicated between the control valve V04 and the control valve V08 through a pipe to form the A-bridge valve group; and the rod chamber of the booster cylinder of the primary injection system is in communication with the rod chamber of the booster cylinder of the secondary injection system through a pipe, and a rodless chamber of the booster cylinder of the primary injection system is in communication with a rodless chamber of the booster cylinder of the secondary injection system through a pipe; and booster accumulators are respectively in communication with the booster cylinder of the primary injection system and the booster cylinder of the secondary injection system and are communicated through a gas pipe.

2. The dual injection system according to claim 1, wherein the speed injection oil circuit of the primary injection system and the speed injection oil circuit of the secondary injection system each further comprise a control valve V03 and an accumulator V01; and the accumulator V0I is in communication with the rodless chamber of the injection cylinder through the control valve V03.

3. The dual injection system according to claim 1, configured with synchronized control, wherein the injection cylinder of the primary injection system comprises a master injection cylinder and the injection cylinder of the secondary injection system comprises a slave injection cylinder, and wherein the system is configured to:

generate a control signal based on a target speed curve and a target position curve, and control, via the speed injection oil circuit, a motion of the master injection cylinder according to the control signal;

control a motion of the slave injection cylinder based on the motion of the master injection cylinder, and perform a feedback adjustment on the slave injection cylinder based on a position deviation between the slave injection cylinder and the master injection cylinder to synchronize the slave injection cylinder with the master injection cylinder; and generate, a corresponding opening control signal based on a target pressure and a feedback pressure from the rod chamber, and perform an opening adjustment on the A-bridge valve group according to the opening control signal to control a motion of the booster cylinder.

4. The dual injection system according to claim 3, wherein the system is configured to:

acquire a feedforward signal $u_1$ by an identification based on the target speed curve and an actual pressure of the master injection cylinder, wherein the feedforward signal $u_1$ is expressed as: $u_1=f_1(p_1,p_2,v_{d1})$;

adaptively process the feedforward signal $u_1$ based on a feedforward proportional curve to acquire a feedforward signal $u_2$ of the master injection cylinder, wherein the feedforward signal $u_2$ is expressed as: $u_2=f_2(u_1,v_{a1},v_{a1})$; and control the speed injection oil circuit to operate respective valve group based on the feedforward signal $u_2$, wherein $p_1$ denotes a rodless chamber pressure of the master injection cylinder, $p_2$ denotes a rod chamber pressure of the master injection cylinder, $v_{d1}$ denotes a target speed of the master injection cylinder, and $v_{a1}$ denotes a current actual speed of the master injection cylinder.

* * * * *